(12) United States Patent
Prager (10) Patent No.: US 11,964,782 B2
(45) Date of Patent: Apr. 23, 2024

(54) FORMED-METAL SHEET AIRFRAME FOR UAVS

(71) Applicant: WING Aviation LLC, Mountain View, CA (US)

(72) Inventor: André Prager, Sunnyvale, CA (US)

(73) Assignee: WING Aviation LLC, Mountain View, CA (US)

( * ) Notice: Subject to any disclaimer, the term of this patent is extended or adjusted under 35 U.S.C. 154(b) by 101 days.

(21) Appl. No.: 17/861,734

(22) Filed: Jul. 11, 2022

(65) Prior Publication Data
US 2024/0010367 A1    Jan. 11, 2024

(51) Int. Cl.
| | |
|---|---|
| *B64U 20/75* | (2023.01) |
| *B64U 10/20* | (2023.01) |
| *B64U 20/30* | (2023.01) |
| *B64U 20/77* | (2023.01) |
| *B64U 20/83* | (2023.01) |

(52) U.S. Cl.
CPC ............ *B64U 20/75* (2023.01); *B64U 10/20* (2023.01); *B64U 20/30* (2023.01); *B64U 20/77* (2023.01); *B64U 20/83* (2023.01)

(58) Field of Classification Search
CPC ........ B64U 20/75; B64U 10/20; B64U 20/30; B64U 20/77; B64U 20/83; B64C 1/00; B64C 2001/0081; Y02T 50/40; F01D 5/147
See application file for complete search history.

(56) References Cited

U.S. PATENT DOCUMENTS

| | | | | |
|---|---|---|---|---|
| 3,936,920 A | * | 2/1976 | Conn, Jr. ........... | B23K 11/0093 |
| | | | | 416/193 A |
| 4,294,419 A | * | 10/1981 | Fouse .................... | B64C 1/061 |
| | | | | 244/119 |
| 5,240,376 A | * | 8/1993 | Velicki .................. | F04D 29/324 |
| | | | | 29/889.71 |
| 5,285,573 A | * | 2/1994 | LeMonds ............. | B23K 20/023 |
| | | | | 29/889.7 |

(Continued)

FOREIGN PATENT DOCUMENTS

| | | |
|---|---|---|
| CA | 3065438 | 5/2016 |
| DE | 102012018871 | 12/2014 |

(Continued)

OTHER PUBLICATIONS

Advantages of Hydroforming for Aerospace Applications, Helander Precision Metal Components, Nov. 19, 2019, 3 pages.

(Continued)

*Primary Examiner* — Medhat Badawi
(74) *Attorney, Agent, or Firm* — CHRISTENSEN O'CONNOR JOHNSON KINDNESS PLLC (57) ABSTRACT

An unmanned aerial vehicle (UAV) includes a fuselage, a pair of wings attached to the fuselage, and a propulsion system mounted to the wings to provide propulsion to the UAV. The fuselage has an outer fuselage shell that is a first mechanical support structure for an airframe of the UAV. The pair of wings is attached to the fuselage and shaped to provide aerodynamic lift. The wings have outer wing shells that are second mechanical support structures for the airframe. The outer fuselage shell or the outer wing shells comprise one or more formed-metal sheets.

22 Claims, 9 Drawing Sheets

(56) References Cited

U.S. PATENT DOCUMENTS

| | | | | |
|---|---|---|---|---|
| 7,988,094 | B2* | 8/2011 | Ostrem | B29C 70/462 |
| | | | | 244/121 |
| 10,894,593 | B2* | 1/2021 | Benson | F16B 7/0493 |
| 11,198,504 | B2* | 12/2021 | Bernard | B64C 25/62 |
| 2005/0040283 | A1* | 2/2005 | Frazer | B63G 8/00 |
| | | | | 244/12.3 |
| 2008/0169381 | A1* | 7/2008 | Ostrem | B29C 70/304 |
| | | | | 49/460 |
| 2013/0075526 | A1* | 3/2013 | Griess | B32B 37/12 |
| | | | | 156/92 |
| 2020/0180760 | A1* | 6/2020 | Richardson | B64F 5/00 |
| 2021/0031897 | A1* | 2/2021 | Haack | B64C 1/064 |
| 2021/0300522 | A1* | 9/2021 | Andreani | B64C 13/30 |
| 2021/0371078 | A1* | 12/2021 | Penella | B64C 1/32 |
| 2023/0303132 | A1* | 9/2023 | Costa | B61D 7/00 |

FOREIGN PATENT DOCUMENTS

| | | |
|---|---|---|
| EP | 3044470 B1 | 7/2019 |
| SE | 437004 | 2/1985 |
| WO | 2014048559 | 4/2014 |

OTHER PUBLICATIONS

Munoz-Rubio et al., Design Optimization of the Aeronautical Sheet Hydroforming Processing Using the Taguchi Method, Applied Sciences, May 10, 2019, 12 pages.

PCT International Search Report and Written Opinion dated Sep. 19, 2023, in corresponding PCT Application No. PCT/2023/026219, 14 pages.

* cited by examiner

FORMED-METAL SHEET AIRFRAME FOR UAVS

TECHNICAL FIELD

This disclosure relates generally to unmanned aerial vehicles, and in particular but not exclusively, relates to airframes for UAVs.

BACKGROUND INFORMATION

An unmanned vehicle, which may also be referred to as an autonomous vehicle, is a vehicle capable of travel without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including package delivery, exploration/reconnaissance, imaging, public safety, surveillance, or otherwise. The mission definition will often dictate a type of specialized equipment and/or configuration of the unmanned vehicle.

Figure 1A:
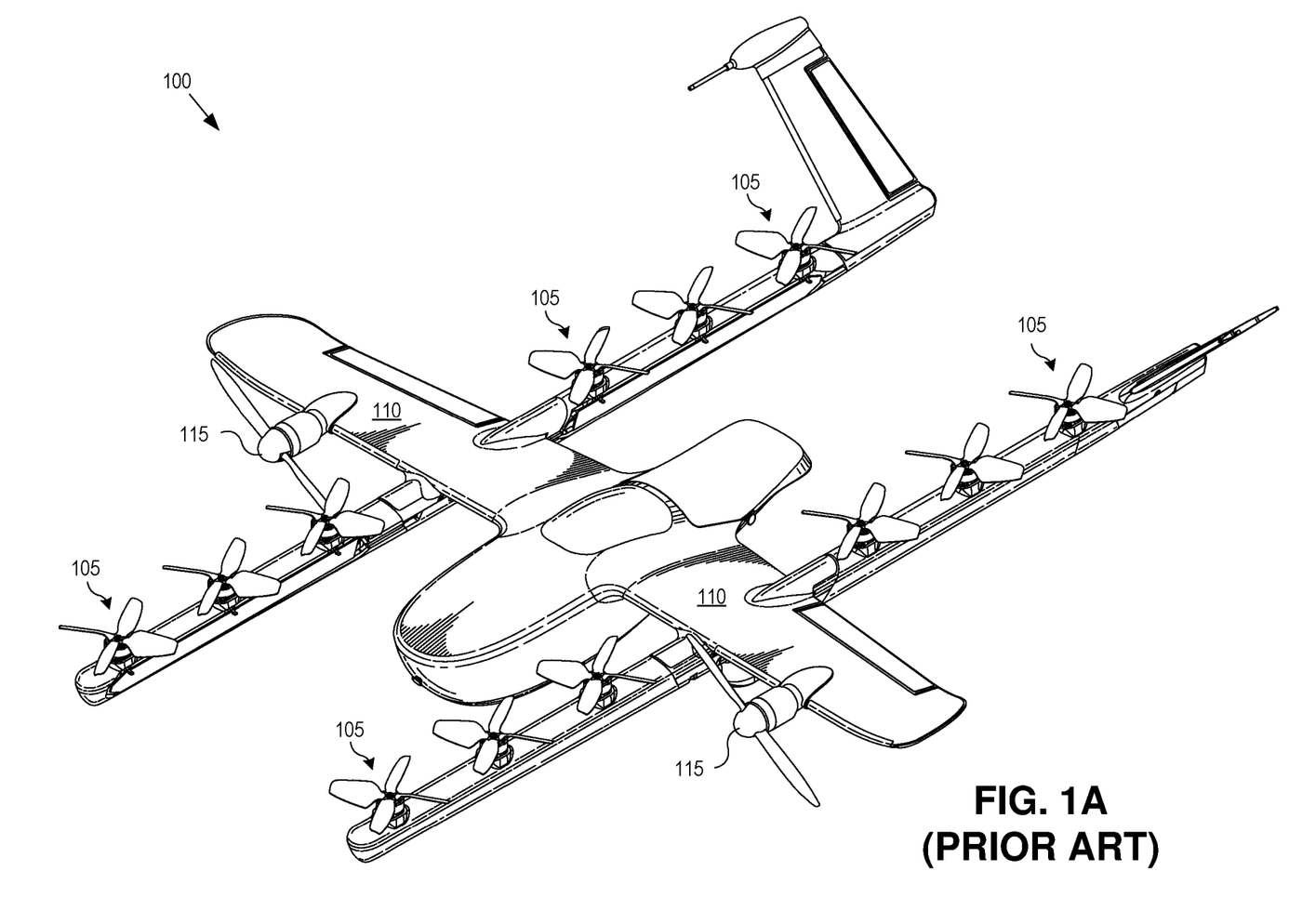
FIG. 1A (PRIOR ART) is a perspective view illustration of an existing unmanned aerial vehicle (UAV) having an outer body shell formed from many distinct components made of a variety of different materials.
Figure 1B:
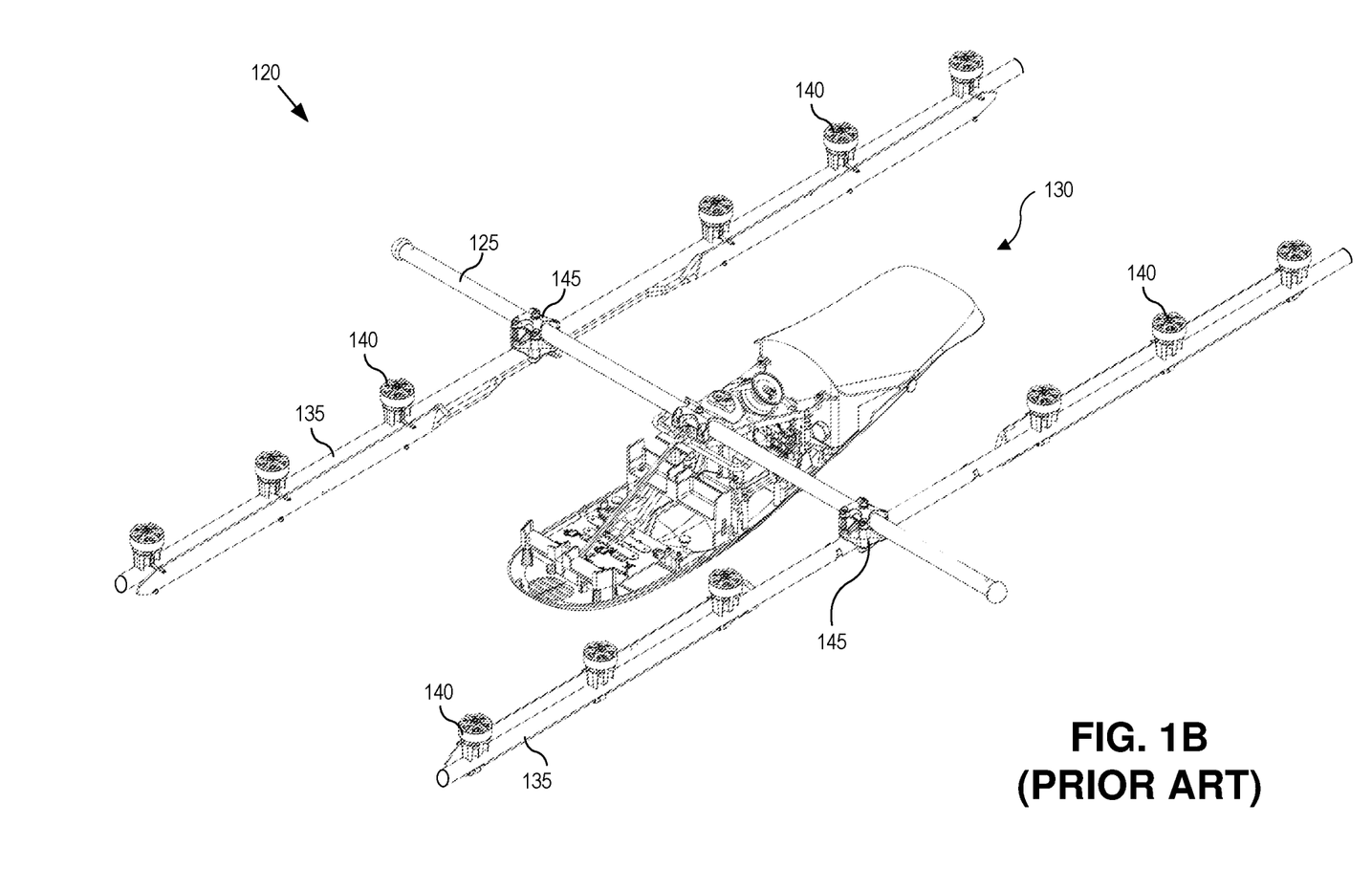
FIG. 1B (PRIOR ART) illustrates an internal H-frame of an existing UAV that is distinct from the outer body shell of the existing UAV, and which H-frame operates as the primary support structure for the airframe of the existing UAV.

FIG. 1A (PRIOR ART) illustrates an unmanned aerial vehicle (UAV) 100 that is well-suited for aerial package deliveries. UAV 100 is capable of vertical takeoff and landing (VTOL) using vertical propulsion units 105 and efficient forward cruise flight via aerodynamic lift provided by wings 110 and forward propulsion units 115. The outer body shell of UAV 100 is assembled from many distinct components made of a variety of different materials including different types of plastic, polystyrene foam, etc. FIG. 1B (PRIOR ART) illustrates an internal H-frame 120 that provides the internal mechanical support structure to the UAV airframe. H-frame 120 is distinct and separate from the outer body shell of the airframe that defines the aerodynamic surfaces or exterior profile shape of the airframe. In particular, a distinct wing spar 125 is the primary, rigid, support structure for wings 110 and links fuselage 130 to the remainder of the airframe. Distinct boom spars 135 provide the primary, rigid support structures to motor rotors 140 of vertical propulsion units 105. Wing spar 125 is tied to boom spars 135 via clamps 145.

UAV 100 with its H-frame 120 may be fabricated of a variety of different materials selected for their strength, durability, weight, and performance characteristics. For example, wing spar 125 and boom spars 135 may be fabricated of carbon fiber tubes while clamps 145 may be fabricated of glass filled nylon, and the outer body shells of the various airframe components (wings, fuselage, booms) may include plastic, polystyrene foam, etc. While this combination of structure and material composition is suitable for the missions intended for UAV 100, it may not adequately account for issues/concerns associated with high-volume manufacturing. If aerial delivery services using UAVs have significant commercial success and market penetration, then manufacturing expense and sustainability related concerns will play an increasingly important role in the design and material selection of future UAVs.

The use of UAVs to deliver small packages to end customers is an idea borne out sustainability concerns related to driving a two ton vehicle to purchase a 300-gram package from your local store. From this reference point, it is natural to consider the sustainability of the UAV airframe as well.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of construction for an unmanned aerial vehicle (UAV) airframe having an outer shell fabricated from formed-metal sheets are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

UAVs described herein have airframes designed with large scale manufacturing and sustainability in mind. Embodiments described use one or more formed-metal sheets to fabricate the outer body shell of the airframe. For example, any one of, or all of, the fuselage, wings, and rotor booms may be fabricated of one or more formed-metal sheets. The formed-metal sheet(s) may be fabricated from thin-walled metal on a scale similar to that of a soda pop can. For example, the thin-walled metal may be 0.1 mm to 0.5 mm thick aluminum. The thin-walled metal may be formed into a variety of shapes that integrate strategically placed rigidity/stiffening features (e.g., formed-in ribs, corrugations, or other three-dimensional surface features). The thin-walled metal sheets may be formed using a variety of manufacturing techniques including stamping, pressing, drawing, extruding, hydroforming, etc. The formed-metal sheets enable the application of unibody and monocoque design principles to UAVs where the outer shell of the airframe operates as a structural skin obviating the need for internal support structures that are distinct from the outer shell of the UAV.

The application of thin-walled formed-metal sheets to implement a monocoque UAV airframe, as described herein, is suitable in a high-volume manufacturing context as the tooling may require significant upfront capital expenditures. However, in return the per unit manufacturing/assembly costs hold the promise of significant savings as compared to the manufacture and assembly of UAV 100. A UAV having its airframe fabricated almost entirely (or entirely) out of thin-walled formed-metal sheets (e.g., aluminum) is a fully recyclable airframe similar to how soda cans are recycled today. This monocoque airframe has the potential to be lighter, reduce component counts, introduce impact zones having locally tuned stiffness, improve UV and environmental resistance, have an accurately modelled structural behavior, be fireproof, reduce wiring due to an airframe wide common ground plane, provide an airframe wide heat sink, have inherent RF shielding, as well as other potential benefits discussed below.

Figure 2:
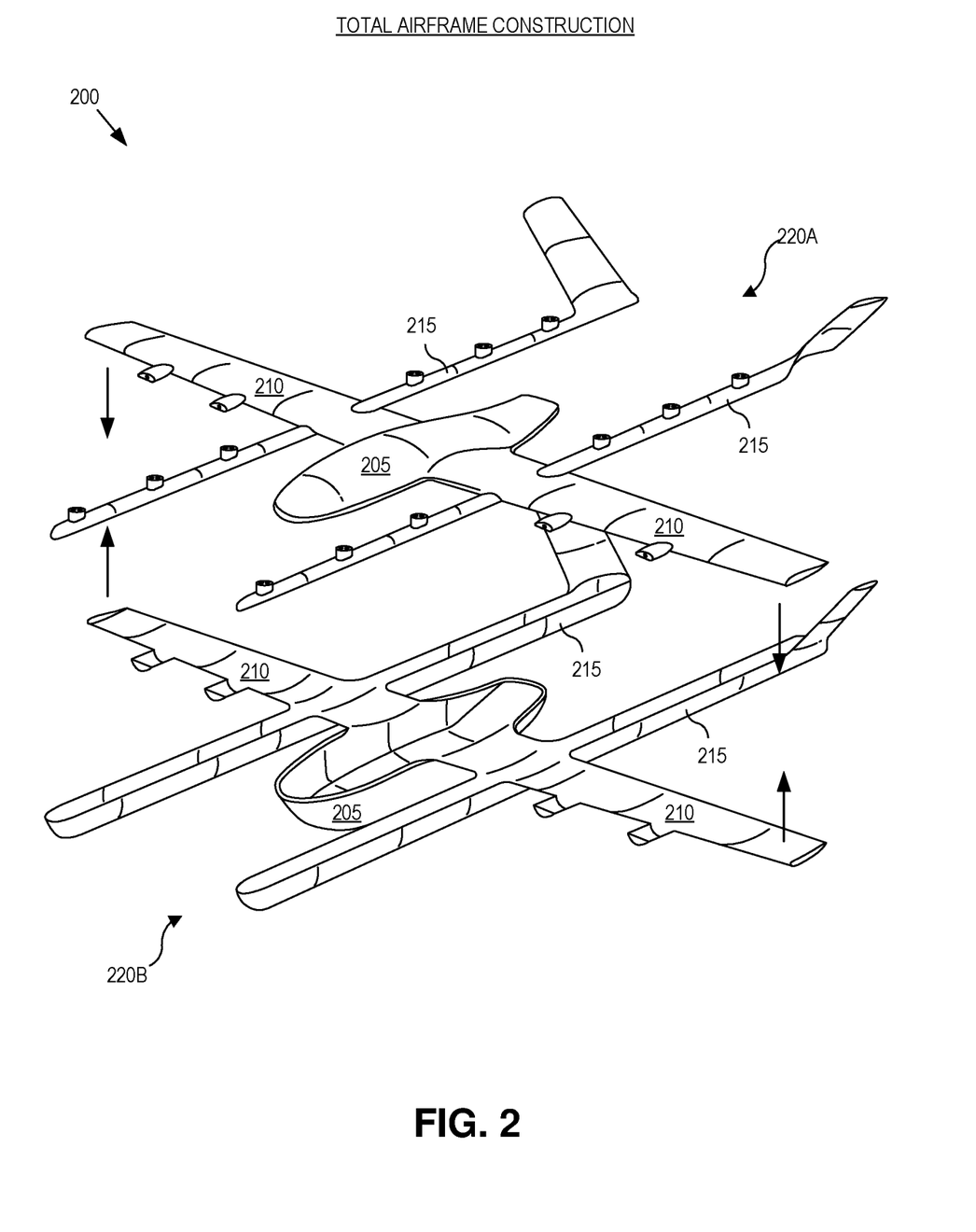
FIG. 2 is a perspective view illustration of a UAV airframe, which integrates the outer body shell and primary mechanical support structures into formed-metal sheets, in accordance with an embodiment of the disclosure.

FIG. 2 is a perspective view illustration of a UAV airframe 200, which integrates the outer body shell and primary mechanical support structures into thin-walled formed-metal sheets, in accordance with an embodiment of the disclosure. In particular, FIG. 2 illustrates an embodiment where the outer body shells (including outer fuselage shell 205, outer wing shells 210, and outer boom shells 215) are separated into upper and lower shell sections 220A and 220B that are mated together to form the airframe of the UAV. UAV airframe 200 is fabricated from one or more thin walled formed-metal sheets. The formed-metal sheets may range in thickness (e.g., between 0.1 mm to 0.5 mm for a majority of each formed-metal sheet) and may have variable thickness throughout the airframe to appropriately carry the localized mechanical stresses that each section bears. Although a majority of each formed-metal sheet may have a thickness ranging between 0.1 mm and 0.5 mm thick, there may be localized regions of a given formed-metal sheet that is thinner or thicker to provide localized weakening or stiffening as desired. Stiffening structures, motor mounts, etc. may be formed into the formed-metal sheet, which serves as a structural skin or monocoque body eliminating the need for internal, distinct wing spars & ribs, boom spars, or fuselage framing/blocking.

In the illustrated embodiment, the upper shell section 220A is a unitary and contiguous formed-metal sheet that includes topside portions of outer fuselage shell 205, outer wing shells 210, and outer boom shells 215. Similarly, the illustrated embodiment of lower shell section 220B is a unitary and contiguous formed-metal sheet that includes bottom-side portions of outer fuselage shell 205, outer wing shells 210, and outer boom shells 215. However, it should be appreciated that in other embodiments, the topside and bottom-side portions of outer fuselage shell 205, outer wing shells 210, and outer boom shells 215 may each be formed of their own pair of topside and bottom-side formed-metals sheets. In yet other embodiments, each airframe section (e.g., fuselage, wings, rotor booms) may be fabricated from a single formed-metal sheet that is a folded or multi-folded thin metal sheet. FIGS. 3-7 describes techniques that may be applied to fabricate and assemble each of these airframe sections.

Figure 3:
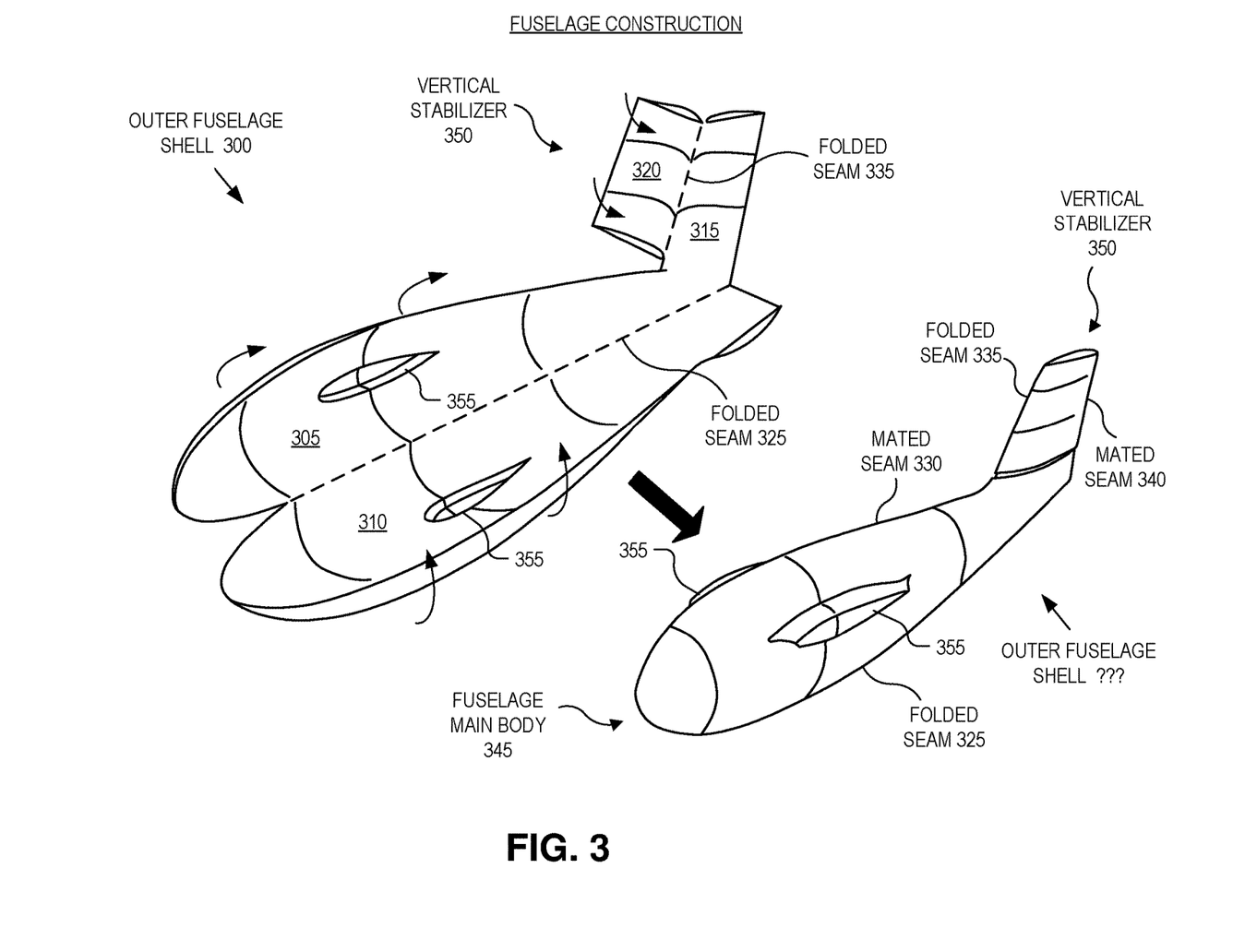
FIG. 3 illustrates an outer fuselage shell of a UAV fabricated from a single formed-metal sheet, in accordance with an embodiment of the disclosure.

FIG. 3 illustrates an outer fuselage shell 300 of a UAV fabricated from a single formed-metal sheet, in accordance with an embodiment of the disclosure. Although FIG. 3 illustrates a fuselage including an integrated vertical stabilizer, as opposed to the vertical stabilizers integrated into the rotor booms as illustrated in FIG. 2, it should be appreciated that the fabrication and assembly techniques described are equally applicable to forming outer fuselage shell 205 in FIG. 2.

The single formed-metal sheet illustrated in FIG. 3 is a thin-walled sheet of metal that has a three-dimensional (3D) shape formed therein to rigidly assume the shape of a fuselage. The formed-metal may assume its shape via a variety of forming techniques including one or more of stamping, pressing, drawing, extruding, hydroforming, or otherwise, followed by one or more origami-like folding steps to achieve the overall shape of the fuselage. In one embodiment the thin-walled metal sheet is aluminum ranging between 0.1 mm to 0.5 mm thick, though other metals, metal alloys, or thickness ranges may also be used.

The illustrated embodiment of outer fuselage shell 300 is a clamshell-like structure made from a single formed-metal sheet. The single formed-metal sheet is a multi-folded structure including first portion 305, second portion 310, third portion 315, and fourth portion 320. The first and second portions 305, 310 are separated along a folded seam 325 along which the single formed-metal sheet is folded until the opposing edges of portions 305 and 310 join together as a mated seam 330 to define the 3D shape of fuselage main body 345. Similarly, third and fourth portions 315, 320 are separated along another folded seam 335 along which the single formed-metal sheet is folded until the opposing edges of the third and fourth portions 315, 320 join together as a mated seam 340 to define the 3D shape of the vertical stabilizer 350. In the illustrated embodiment, folded seam 335 is a leading aerodynamic edge while mated seam 340 is a trailing aerodynamic edge. First portion 305 and third portion 315 are a unitary formed metal section that are not separated by any folded seam. Folded seams 325 and 335 may be stamped, scribed, or otherwise marked into the single formed-metal sheet to establish the fold locations. In other embodiments, folded seams 325 are defined naturally via the overall geometry. For example, folded seams 325 and 335 are flat and straight contour lines (e.g., not 3D shaped) and thus are natural contour lines for folding.

Component counts may be reduced by integrating various stiffening/mounting features into the formed-metal sheet. For example, FIG. 3 illustrates how wing mounts 355 may be shaped into the single formed-metal sheet. Additionally, localized corrugations or surface reliefs may be strategically placed to stiffen fuselage main body 345 about wing mounts 355, or other locations. Corrugations may also be formed into outer shells over larger surface areas to suppress vibration and noise resonant modes.

Figure 4A:
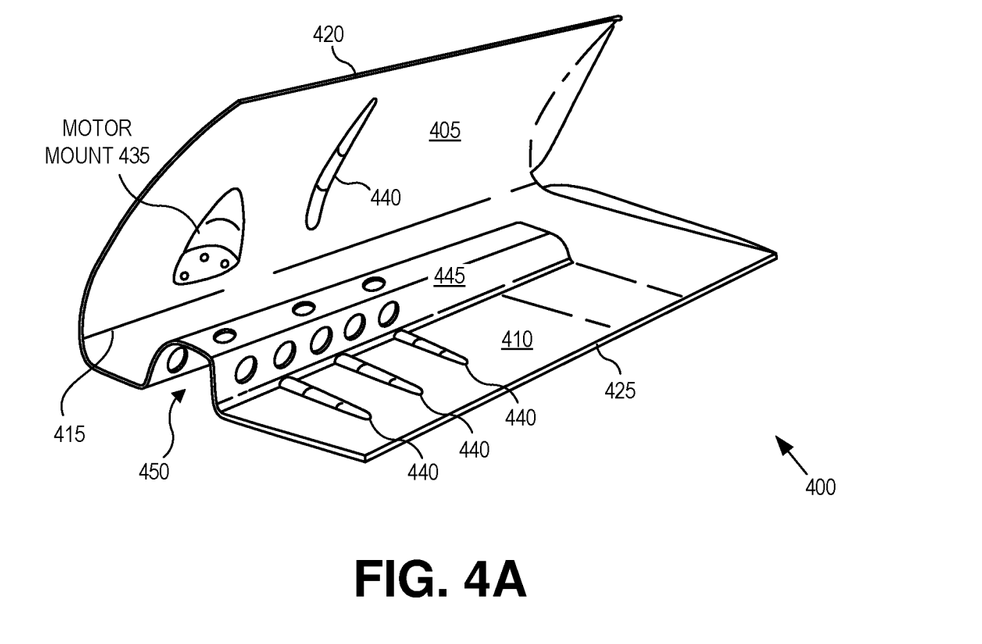
FIGS. 4A-C illustrate different views of an outer wing shell having a clamshell-like design formed from a single formed-metal sheet, in accordance with an embodiment of the disclosure.
Figures 4B, 4C:
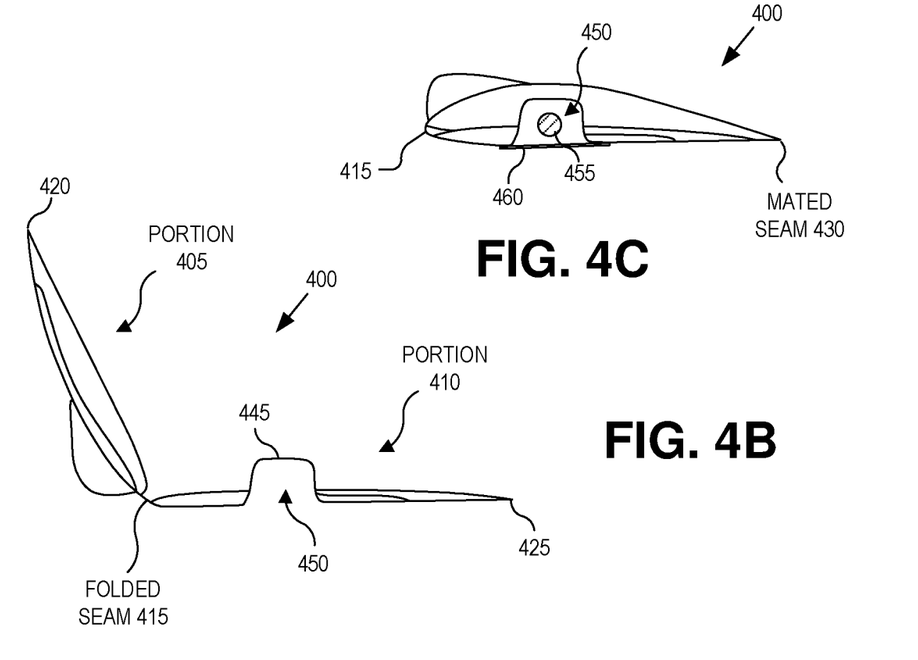

FIGS. 4A-C illustrate different views of an outer wing shell 400 having a clamshell-like design formed from a single formed-metal sheet, in accordance with an embodiment of the disclosure. The clamshell-like construction of outer wing shell 400 may be used in connection with the clamshell-like construction of outer fuselage shell 300, or it may be used in connection with UAV airframe 200 to implement the construction/assembly of just outer wing shells 210. It should be appreciated that the various construction/assembly techniques described herein are not mutually exclusive techniques, but rather may be mixed or interchanged as desired to construct monocoque UAV airframes using thin-walled formed-metal sheet(s).

The illustrated embodiment of outer wing shell 400 is made from a single formed-metal sheet having a first portion 405 and second portion 410. First portion 405 is separated from second portion 410 along a folded seam 415 along which the single formed-metal sheet is folded. The opposing edges 420 and 425 of each portion 405 and 410, respectively, are folded over to adjoin each other at a mated seam 430. In the illustrated embodiment, folded seam 415 is located along the leading edge of outer wing shell 400 while mated seam 430 is located along the trailing edge of outer wing shell 400.

Fabricating outer wing shell 400 from a formed-metal sheet also presents opportunities to integrate other mechanical structures into outer wing shell 400 thereby reducing the part count and overall weight of the wing. For example, a motor mount 435 may be shaped into the single formed-metal sheet. Motor mount 435 may provide a mounting location for forward propulsion units (e.g., forward propulsion units 115). The surface reliefs inherent in the shape of motor mount 435 provide increased rigidity for mounting propulsion units; however, in various embodiments, a localized thickness of the formed-metal sheet may be increased or additional stiffening structures may be introduced.

Stiffening structures may be integrated into outer wing shell 400. For example, formed-in ribs 440 and an integrated spar structure 445 may be formed into the single formed-metal sheet of outer wing shell 400. In the illustrated embodiment, formed-in ribs 440 run substantially perpendicular to the longitudinal axis of integrated spar structure 445 providing increased rigidity in orthogonal dimensions. Integrated spar structure 445 may be implemented as a channel relief (e.g., boxed channel, etc.) pressed into the single formed-metal sheet. Integrated spar structure 445 can replace the need for a separate wing spar, such as wing spar 125 in FIG. 1B. Additionally, integrated spar structure 445 can serve other purposes beyond mechanical support. The integrated spar structure 445 may serve as a channel for a variety of purposes, including placement of additional stiffening structures such as a carbon spar for very high stress tolerant designs. In the illustrated embodiment, integrated spar structure 445 defines a wiring channel 450 through which wire cables 455 are run to the forward propulsion units. Cutouts may be disposed into integrated spar structure 445 for feeding wires in and out of the wiring channel 450 and also to reduce overall weight. In the illustrated embodiment, wiring channel 450 would disrupt the smooth flow of air across the wing unless it is covered. Accordingly, in one embodiment, an adhesive cover 460 (e.g., sticker) is disposed over wiring channel 450 to provide a smooth outer aerodynamic surface across wiring channel 450 and integrated spar structure 445. In other embodiments, a metal or plastic snap in cover may be used instead. Alternatively, a metal cover may be spot welded to the wing shell to provide further structural stiffening by creating a fully closed spar box.

Figure 5:
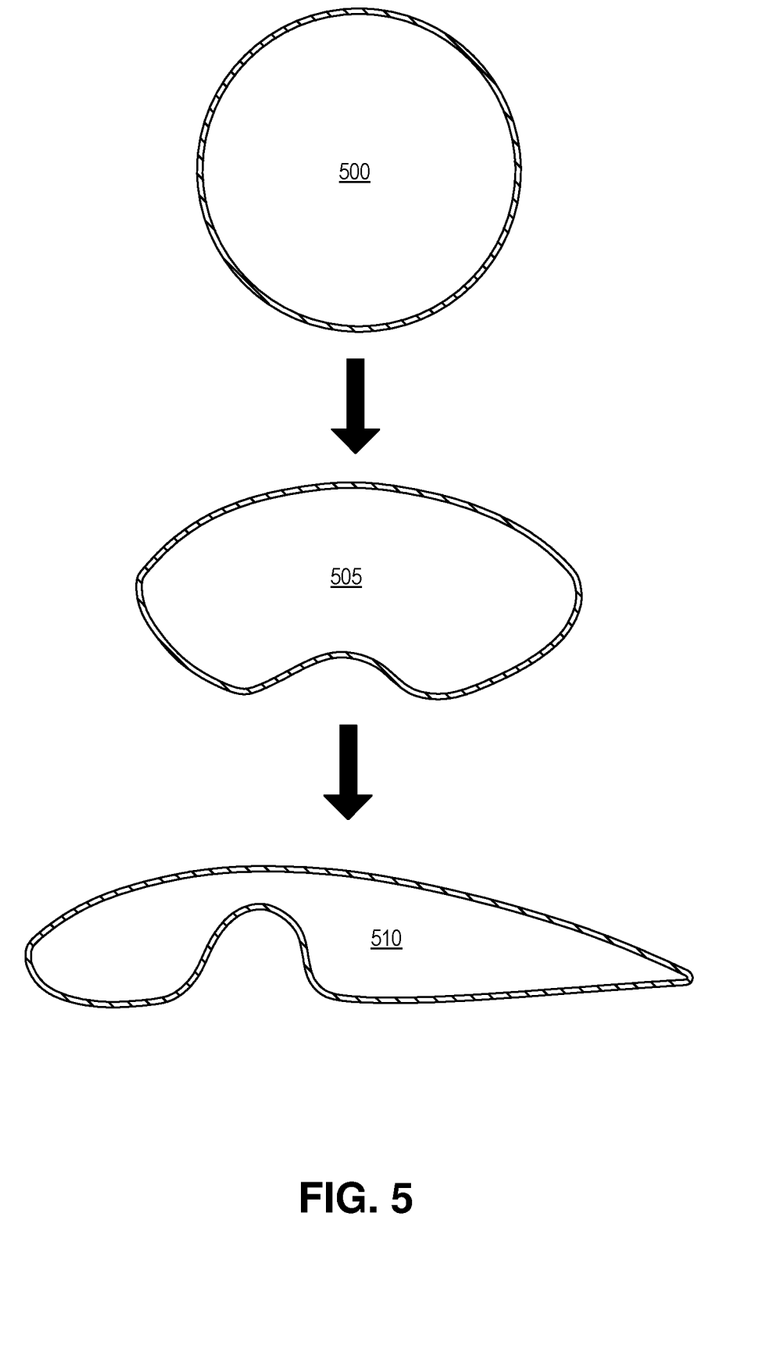
FIG. 5 illustrates how a single sheet-metal tube may be formed into a wing, in accordance with an embodiment of the disclosure.

As previously mentioned, a variety of techniques may be used to shape a thin wall metal sheet into the various outer body shells of a UAV. These metal forming techniques may include stamping, pressing, drawing, extruding, hydroforming, or otherwise. FIG. 5 illustrates one such example where a single sheet-metal tube 500 is preformed into an initial airfoil shape 505 and then hydroforming is used to achieve the final form 510. Alternatively, tube 500 may undergo multiple stages of hydroforming to achieve the final shape. The various wiring channels, surface reliefs, stiffening structures, and weight saving cutouts can also be formed into the airfoil in the same or additional forming steps.

Figure 6:
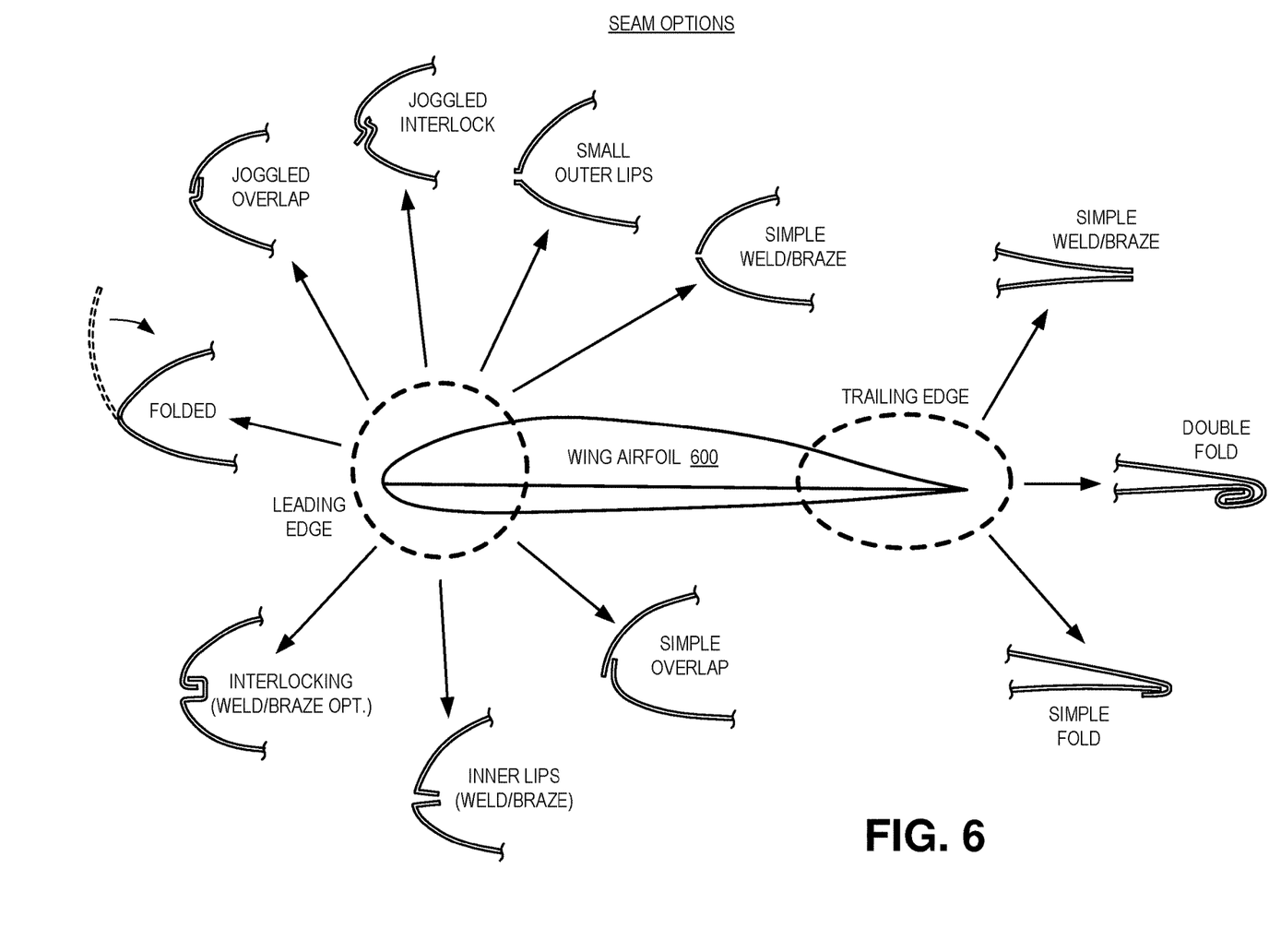
FIG. 6 illustrates different examples of seam options for interfacing different portions of one or more formed-metal sheets, in accordance with an embodiment of the disclosure.

FIG. 6 illustrates different examples of seam options for interfacing different portions of one or more formed-metal sheets, in accordance with an embodiment of the disclosure. The seam options illustrated in FIG. 6 may be used to implement the various folded/mated seams described above. In particular, FIG. 6 illustrates proposed examples of leading edge seams and trailing edge seams for a wing airfoil 600. However, these seam options are equally applicable to any of UAV airframe 200, outer fuselage shell 300, outer wing shell 400, or outer boom shell 700 (described below).

Figure 7A:
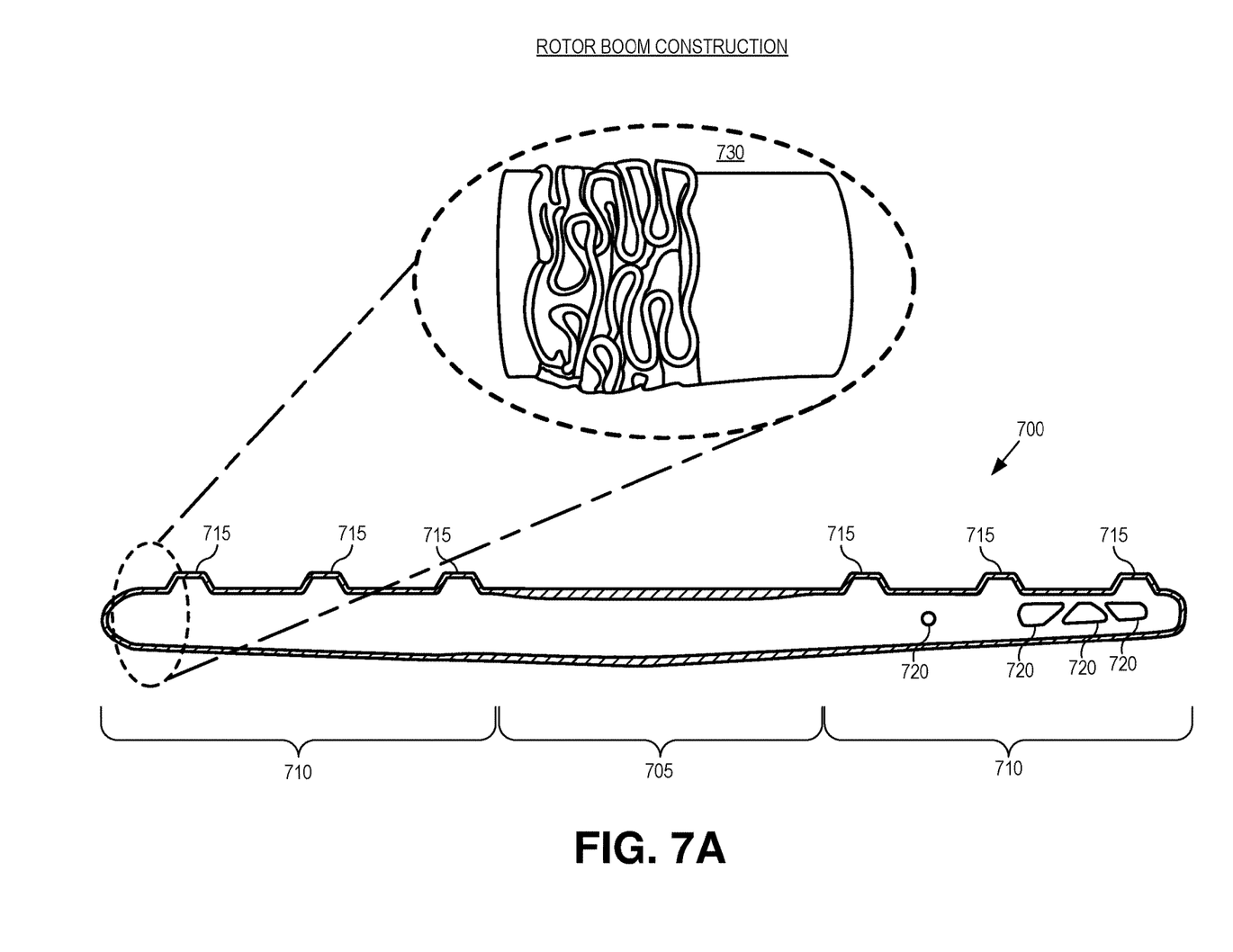
FIG. 7A illustrates a longitudinal cross-section through a rotor boom of a UAV airframe, in accordance with an embodiment of the disclosure.

FIG. 7A illustrates a longitudinal cross-section through an outer boom shell 700 of a UAV airframe, in accordance with an embodiment of the disclosure. Outer boom shell 700 may implement the outer shell of a rotor boom that supports multiple vertical lift propulsion units (e.g., six are illustrated in FIG. 7A). Rotor boom shell 700 may be used in connection with UAV airframe 200 to implement the construction/assembly of outer boom shells 215. It should be appreciated that the various construction/assembly techniques described herein are not mutually exclusive techniques, but rather may be mixed or interchanged as desired to construct monocoque UAV airframes using thin-walled formed-metal sheet(s).

The illustrated embodiment of outer boom shell 700 is made from one or two formed-metal sheets. The illustrated embodiment of outer boom shell 700 includes a middle section 705 flanked by distal sections 710. Middle section 705 has thicker sidewalls than the distal sections 710 where integrated motor mounts 715 are located. Middle section 705 is thicker to provide increased localized strength for mounting the rotor boom to a wing and to better handle bending loads, which are higher near the center of outer boom shell 700 compared to the ends. The distal sections 710 extend fore and aft of the wing and have thinner sidewall thicknesses for weight savings. Cutouts 720 in the single formed-metal sheet may be integrated to reduce overall weight, fish wires, strategically weaken the structure to introduce crumple zones, or otherwise. Crumple zones 730 may also be integrated into the single formed-metal sheet by weakening the single formed-metal sheet in strategic areas (e.g., distal sections 710) to provide controlled failure zones in the event of an impact. Cutouts 720 may be closed off by adhesive tape or weld-on covers. The adhesive tape may provide weight savings while weld-on covers could provide temporary access for installing components and then restoration of the skin strength.

Figure 7B:
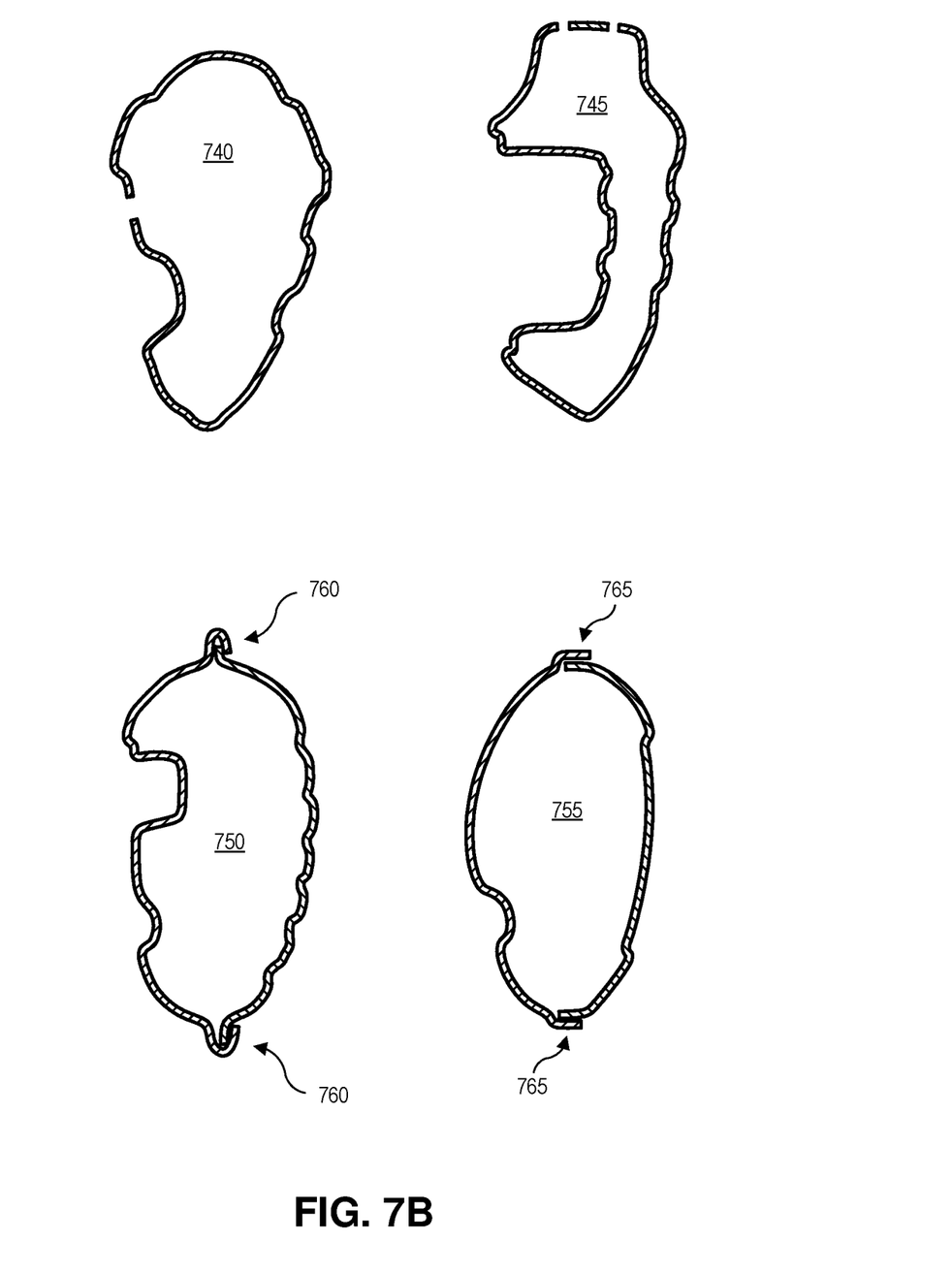
FIG. 7B illustrates lateral cross-sections through rotor booms using different types of mated seams to join formed-metal sheets, in accordance with an embodiment of the disclosure.

FIG. 7B illustrates lateral cross-sections 740-755 through example rotor booms using different types of mated seams to join one or two formed-metal sheets, in accordance with an embodiment of the disclosure. As illustrated, the perimeter shape of each outer boom shell may be pressed into irregular shapes to increase rigidity and provide protected wiring channels. The irregular shapes may include surface corrugations (see cross-section 750), surface reliefs (see cross-section 755), or otherwise. Cross-sections 740 and 745 use a single formed-metal sheet to define the outer boom shell. Hydroforming is one potential technique for forming cross-sections 740 and 745. In contrast, cross-sections 750 and 755 use two formed-metal sheets that are joined at mated seams 760 or 765. In one embodiment, mated seam 760 could also be implemented as a double fold as illustrated in FIG. 6. The mated seams may be vertically aligned, horizontally aligned, diagonally aligned, or at any other angle/orientation. In fact, it is envisioned that any of the seam options illustrated in FIG. 6 may be applied to boom and fuselage shells as well.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An unmanned aerial vehicle (UAV) comprising:
a fuselage having an outer fuselage shell that is a first mechanical support structure for an airframe of the UAV;
a pair of wings attached to the fuselage and shaped to provide aerodynamic lift, the wings having outer wing shells that are second mechanical support structures for the airframe; and
a propulsion system mounted to the wings to provide propulsion to the UAV,
wherein the outer fuselage shell or the outer wing shells comprise one or more formed-metal sheets,
wherein the outer fuselage shell comprises a single fuselage formed-metal sheet with first and second portions separated along a first folded seam along which the single fuselage formed-metal sheet is folded and a mated seam along which the first and second portions of the single fuselage formed-metal sheet are mated to each other.

2. The UAV of claim 1, wherein the single fuselage formed-metal sheet comprises a multi-folded structure including third and fourth portions separated along a second folded seam.

3. The UAV of claim 2, wherein the first and third portions of the single fuselage formed-metal sheet comprises a unitary formed metal section that is not separated by any folded seam.

4. The UAV of claim 2, wherein the first and second portions of the single fuselage formed-metal sheet define a fuselage main body and the third and fourth portions of the single fuselage formed-metal sheet define a vertical stabilizer of the UAV.

5. The UAV of claim 1, wherein the first and second portions of the single fuselage formed-metal sheet each include integrated wing mounts shaped into the single fuselage formed-metal sheet.

6. The UAV of claim 1, wherein the outer wing shells each comprise a single wing formed-metal sheet with first and second portions separated along a folded seam along which the single wing formed-metal sheet is folded and a mated seam along which the first and second portions of the single wing formed-metal sheet are mated to each other.

7. The UAV of claim 6, wherein each of the outer wing shells includes a motor mount shaped into the single wing formed-metal sheet.

8. The UAV of claim 6, wherein each of the outer wing shells includes a wiring channel shaped into the single wing formed-metal sheet that also forms an integrated spar structure.

9. The UAV of claim 8, further comprising:
an adhesive or weld-on cover disposed over the wiring channel to provide a smooth outer aerodynamic surface across the wiring channel formed within the integrated spar structure.

10. The UAV of claim 6, wherein the folded seam comprises a leading edge of a given wing and the mated seam comprises a trailing edge of the given wing.

11. An unmanned aerial vehicle (UAV) comprising:
a fuselage having an outer fuselage shell that is a first mechanical support structure for an airframe of the UAV;
a pair of wings attached to the fuselage and shaped to provide aerodynamic lift, the wings having outer wing shells that are second mechanical support structures for the airframe; and
a propulsion system mounted to the wings to provide propulsion to the UAV,
wherein the outer fuselage shell or the outer wing shells comprise one or more formed-metal sheets,
wherein the outer fuselage shell and the outer wing shells are separated into upper and lower shell sections, wherein the upper shell sections of the fuselage and the wings comprise a first unitary and contiguous formed-metal sheet and the lower shell sections of the fuselage and the wings comprise a second unitary and contiguous formed-metal sheet that are mated together to form the airframe of the UAV.

12. The UAV of claim 1, wherein the one or more formed-metal sheets comprise one or more hydroformed, stamped, pressed, drawn, or extruded metal sheets having a thickness for a majority of each of the one or more formed-metal sheets ranging between 0.1 mm and 0.5 mm.

13. An unmanned aerial vehicle (UAV) comprising:
a fuselage having an outer fuselage shell that is a first mechanical support structure for an airframe of the UAV;
a pair of wings attached to the fuselage and shaped to provide aerodynamic lift, the wings having outer wing shells that are second mechanical support structures for the airframe; and
a propulsion system mounted to the wings to provide propulsion to the UAV,
a pair of rotor booms each mounted to, and extending fore and aft of, a corresponding one of the wings, the rotor booms each providing a plurality of vertical lift rotor mounts for the propulsion system,
wherein the rotor booms have outer boom shells each shaped from a single formed-metal sheet that is thinner at distal end sections than a middle section of each of the rotor booms,
wherein the UAV comprises a vertical takeoff and land (VTOL) aircraft.

14. The UAV of claim 13, wherein the rotor booms each include one or more crumple zones where the single formed-metal sheet is weakened to provide a controlled failure zone in an event of an impact.

15. An unmanned aerial vehicle (UAV) comprising:
an airframe including a fuselage and a pair of wings; and
a propulsion system mounted to the airframe to provide propulsion to the UAV,
wherein the wings each have an outer wing shell that is a mechanical support structure for the airframe and is shaped to provide aerodynamic lift,
wherein the outer wing shell is a first single formed-metal sheet,
wherein a wiring channel is shaped into the first single formed-metal sheet,
wherein the wiring channel defines an integrated spar structure for stiffening the outer wing shell.

16. The UAV of claim 15, wherein the first single formed-metal sheet includes:
first and second portions separated along a first folded seam along which the first single formed-metal sheet is folded; and
a mated seam along which the first and second portions of the first single formed-metal sheet are mated to each other.

17. The UAV of claim 16, wherein the wiring channel is shaped into the first portion of the first single formed-metal sheet.

18. The UAV of claim 15, further comprising:
an adhesive or weld-on cover disposed over the wiring channel to provide a smooth outer aerodynamic surface across the wiring channel formed within the integrated spar structure.

19. The UAV of claim 15, wherein the fuselage includes an outer fuselage shell that is a second single formed-metal sheet, the outer fuselage shell comprising a multi-folded structure including:
first and second portions separated along a first folded seam of the second single formed-metal sheet to define a fuselage main body; and
third and fourth portions separated along a second folded seam of the second single formed-metal sheet to define a vertical stabilizer.

20. The UAV of claim 17, wherein the first and third portions of the second single formed-metal sheet comprises a unitary formed metal section that is not separated by any folded seam and wherein the first and second portions of the multi-folded structure include integrated wing mounts shaped into the second single formed-metal sheet.

21. An unmanned aerial vehicle (UAV) comprising:
a fuselage having an outer fuselage shell that is a first mechanical support structure for an airframe of the UAV;
a pair of wings attached to the fuselage and shaped to provide aerodynamic lift, the wings having outer wing shells that are second mechanical support structures for the airframe; and
a propulsion system mounted to the wings to provide propulsion to the UAV,
wherein the outer wing shells each comprise a single wing formed-metal sheet,
wherein each of the outer wing shells includes a motor mount shaped into the single wing formed-metal sheet.

22. An unmanned aerial vehicle (UAV) comprising:
a fuselage having an outer fuselage shell that is a first mechanical support structure for an airframe of the UAV;
a pair of wings attached to the fuselage and shaped to provide aerodynamic lift, the wings having outer wing shells that are second mechanical support structures for the airframe; and
a propulsion system mounted to the wings to provide propulsion to the UAV,
wherein the outer fuselage shell or the outer wing shells comprise one or more formed-metal sheets,
wherein the outer wing shells each comprise a single wing formed-metal sheet with first and second portions separated along a folded seam along which the single wing formed-metal sheet is folded and a mated seam along which the first and second portions of the single wing formed-metal sheet are mated to each other.

* * * * *

UNITED STATES PATENT AND TRADEMARK OFFICE
CERTIFICATE OF CORRECTION

PATENT NO. : 11,964,782 B2
APPLICATION NO. : 17/861734
DATED : April 23, 2024
INVENTOR(S) : André Prager It is certified that error appears in the above-identified patent and that said Letters Patent is hereby corrected as shown below:

In the Claims

| Column | Line | Claim | |
|--------|------|-------|---|
| 10 | 4 | 20 | change "claim 17," to -- claim 19, -- |

Signed and Sealed this
Twenty-eighth Day of January, 2025

Coke Morgan Stewart
*Acting Director of the United States Patent and Trademark Office*